United States Patent
Bolon et al.

(10) Patent No.: US 11,655,729 B1
(45) Date of Patent: May 23, 2023

(54) METHOD FOR CONTROLLING A VALVE

(71) Applicant: PRATT & WHITNEY CANADA CORP., Longueuil (CA)

(72) Inventors: William Bolon, Ottawa (CA); Mohammad Pournazeri, Woodbridge (CA); Nastaran Nayebpanah, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/680,455

(22) Filed: Feb. 25, 2022

(51) Int. Cl.
  *F01D 19/00* (2006.01)
  *F02C 7/27* (2006.01)
(52) U.S. Cl.
  CPC .............. *F01D 19/00* (2013.01); *F02C 7/27* (2013.01); *F05D 2260/60* (2013.01); *F05D 2260/85* (2013.01); *F05D 2270/304* (2013.01); *F05D 2270/52* (2013.01)
(58) Field of Classification Search
  CPC . F01D 19/00; F02C 7/27; F16K 31/04; F16K 31/046; F16K 31/06; F16K 31/0675; H03K 7/08; F05D 2260/60; F05D 2260/85; F05D 2270/304; F05D 2270/52; H01F 2007/1888
  See application file for complete search history.

(56) References Cited

U.S. PATENT DOCUMENTS

| 5,083,541 A * | 1/1992 | Chen | F02D 41/2451 |
| | | | 123/339.22 |
| 10,040,577 B2 | 8/2018 | Teichoiz et al. | |
| 2008/0082242 A1* | 4/2008 | Dell'Eva | F16H 61/0251 |
| | | | 477/34 |
| 2017/0233103 A1* | 8/2017 | Teicholz | B64F 1/34 |
| | | | 701/100 |
| 2021/0189983 A1* | 6/2021 | Tremblay | F02D 41/062 |

FOREIGN PATENT DOCUMENTS

CN          103195975       2/2015

\* cited by examiner

*Primary Examiner* — Loren C Edwards
(74) *Attorney, Agent, or Firm* — Norton Rose Fulbright Canada LLP

(57) ABSTRACT

The method can include generating a first duty cycle value for the PWM; monitoring a current value of a parameter; generating a duty cycle limit value for the PWM, including activating more than one duty cycle limit functions based on corresponding activation conditions, the corresponding activation conditions based on the current value of the parameter, each of the more than one duty cycle limit functions generating a corresponding duty cycle limit subvalue when the corresponding activation conditions are met, and setting the duty cycle limit value to a sum of the generated duty cycle limit subvalues; setting a second duty cycle value for the PWM, as the first duty cycle value or as the duty cycle limit if the first duty cycle value exceeds the duty cycle limit; and, applying the PWM at the second duty cycle value to the valve.

20 Claims, 13 Drawing Sheets

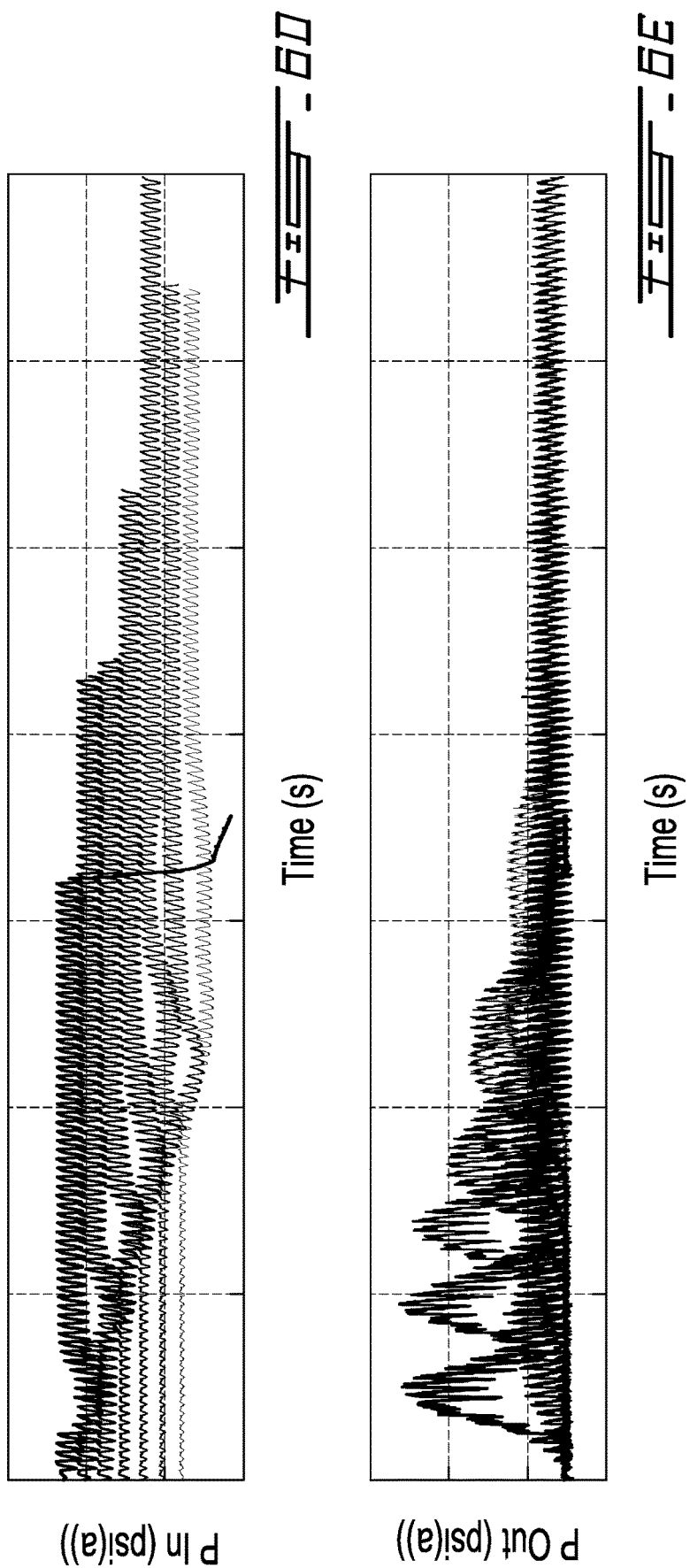

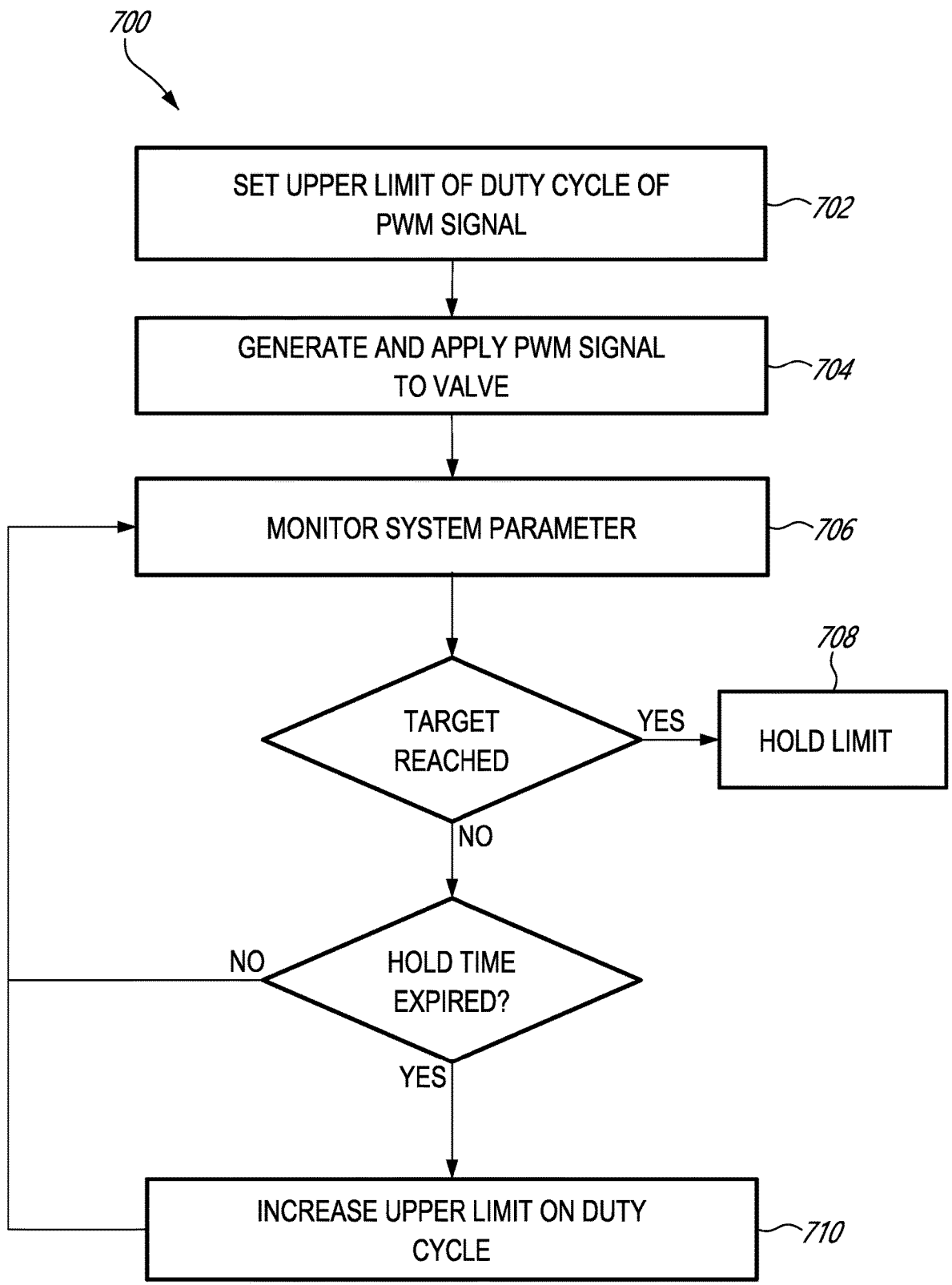

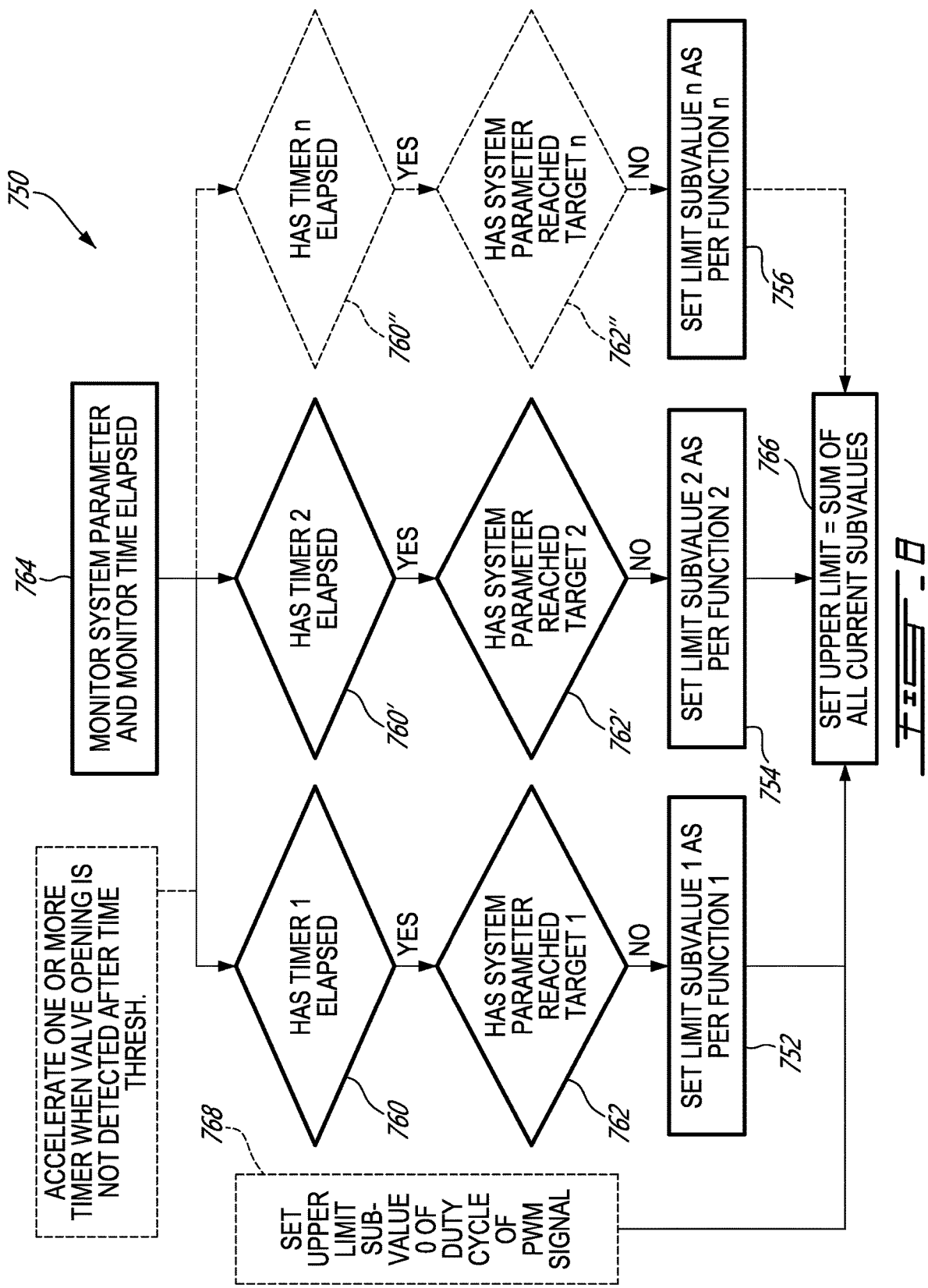

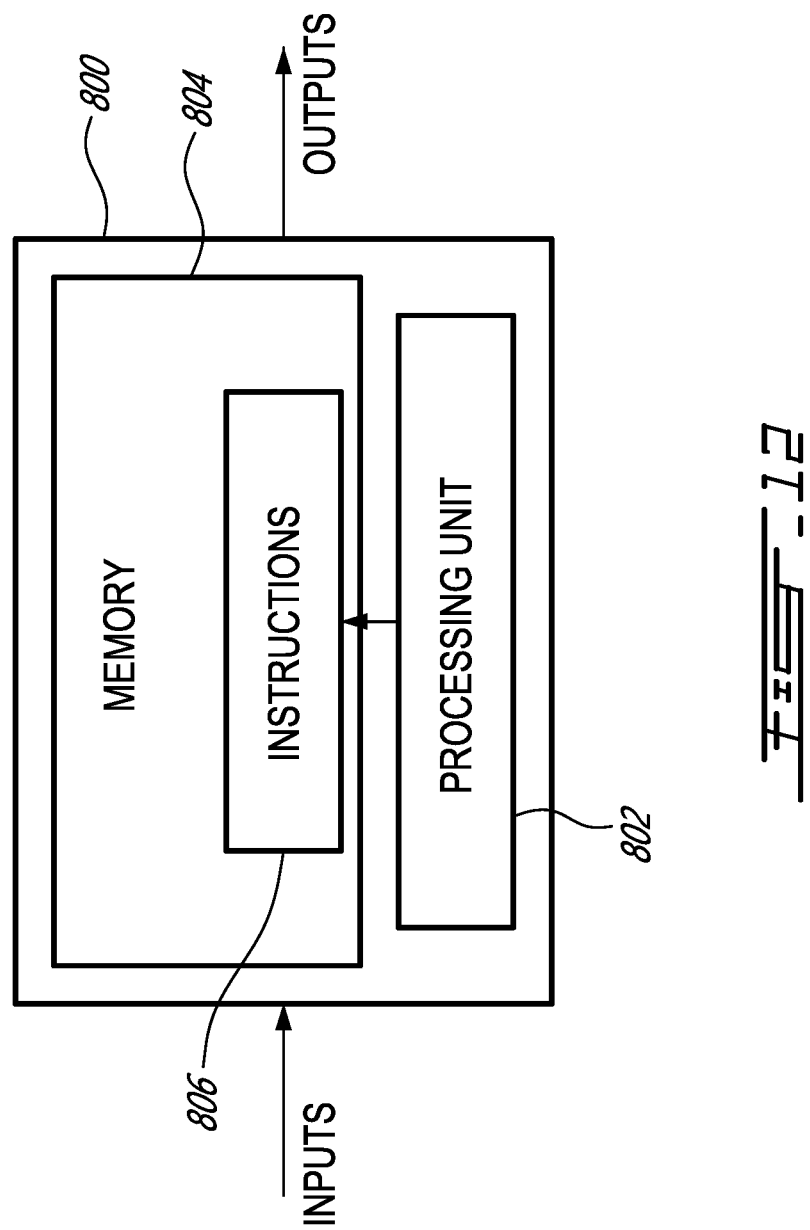

METHOD FOR CONTROLLING A VALVE

TECHNICAL FIELD

The application relates generally to aircraft engines and, more particularly, to the operation and control of on-off valves.

BACKGROUND OF THE ART

Many aircraft engines use solenoid valves. Solenoid valves are sometimes referred to as on-off valves due to the fact that they are typically operated in an "on-off" manner. On-off refers to the fact that activation power of the solenoid is switched between full amplitude and zero. Full amplitude can lead to the fully open or to the fully closed position depending on the type of valve, the valve typically being biased (e.g. spring-biased) to the other position. However, there is inertia and to the moving component of the valve (e.g. poppet, moving solenoid part), and other forces can act on it as well (e.g. friction, fluid—e.g. air—pressure) and applying full amplitude or zero does not lead immediately to fully open or fully closed position due to these practical, physics-related considerations. These latter physics-related considerations can be harnessed to drive the valve at intermediate opening %, by alternating the power through the solenoid between "on" and "off", such as by using a square wave for instance. Moreover, the degree of opening (e.g. % value of opening between 0% and 100%, or corresponding value in terms of poppet displacement for instance) can be controlled by changing the "duty cycle" of the power through the solenoid. Indeed, while the power through the solenoid is controlled in an on-off manner, e.g. with a square wave, the proportion of the on time vs. off time can be controlled to intermediary values. This control scheme is referred to as pulse width modulation (PWM), and can thus be said to more specifically involve controlling the duty cycle of the pulse width.

In some valves, the mechanical reaction of the degree of opening of the valve can vary as a function of parameters which are not known a priori. Such parameters can include a degree of wear of the valve or a pressure acting on components of the valve for instance. This can be the case, in particular, in valves associated to the air starter of an aircraft engine, which can be used to control the flow of air from an external, e.g. airport, source to airfoils of a rotor (typically high-pressure rotor) of the engine. In such applications, the pressure of the external air source can vary significantly from one airport to another for instance, and can be a priori unknown to the engine controller. It may thus be desirable to configure the engine controller's pulse width modulation control scheme in a manner for it to react in a suitable manner in a variety of conditions.

While existing pulse width modulation control schemes were satisfactory to a certain degree, there always remains room for improvement. In particular, in the case of a starter valve, there can be challenge in simultaneously allowing i) satisfactory reaction time by opening the valve quickly, ii) avoiding overshooting of the valve opening to avoid potential damage to the engine by excessive pressure, iii) limiting cycling between partially or fully open and the fully closed positions to limit wear.

SUMMARY

In one aspect, there is provided a method for controlling a degree of opening of a valve using pulse width modulation (PWM), the degree of opening affecting a parameter of a system, the method comprising: at a controller, generating a first duty cycle value for the PWM; at the controller, monitoring a current value of the parameter; at the controller, generating a duty cycle limit value for the PWM, including activating more than one duty cycle limit functions based on corresponding activation conditions, the corresponding activation conditions being different for different ones of the more than one duty cycle limit functions and based on the current value of the parameter, each of the more than one duty cycle limit functions generating a corresponding duty cycle limit subvalue when the corresponding activation conditions are met; setting the duty cycle limit value to a sum of the generated duty cycle limit subvalues; at the controller, setting a second duty cycle value for the PWM, said second duty cycle value being equal to the first duty cycle value when the first duty cycle value is below or equal to the duty cycle limit value and being equal to the duty cycle limit value when the first duty cycle value is above or equal to the duty cycle limit value; and at the controller, applying the PWM at the second duty cycle value to the valve.

In another aspect, there is provided a gas turbine engine comprising: a high pressure rotor; a rotation speed sensor coupled to the high pressure rotor; a solenoid valve forming part of an air starter system of the gas turbine engine; a controller configured to generate a first duty cycle value for controlling a degree of opening of the solenoid valve using pulse width modulation (PWM); monitor a current value rotation speed via the rotation speed sensor; generate a duty cycle limit value for the PWM, including activating more than one duty cycle limit functions based on corresponding activation conditions, the corresponding activation conditions being different for different ones of the more than one duty cycle limit functions and based on the current value of the parameter, each of the more than one duty cycle limit functions generating a corresponding duty cycle limit subvalue when the corresponding activation conditions are met; setting the duty cycle limit value to a sum of the generated duty cycle limit subvalues; set a second duty cycle value for the PWM, said second duty cycle value being equal to the first duty cycle value when the first duty cycle value is below or equal to the duty cycle limit value and being equal to the duty cycle limit value when the first duty cycle value is above or equal to the duty cycle limit value; and apply the PWM at the second duty cycle value to the valve.

In a further aspect, there is provided a computer program product stored in a non-transitory memory and which, when executed upon by a processor is operable to control a degree of opening of a valve using pulse width modulation (PWM), the degree of opening affecting a parameter of a system, said control of the degree of opening of the valve including: generating a first duty cycle value for controlling a degree of opening of the solenoid valve using pulse width modulation (PWM); monitoring a current value rotation speed via the rotation speed sensor; generating a duty cycle limit value for the PWM, including activating more than one duty cycle limit functions based on corresponding activation conditions, the corresponding activation conditions being different for different ones of the more than one duty cycle limit functions and based on the current value of the parameter, each of the more than one duty cycle limit functions generating a corresponding duty cycle limit subvalue when the corresponding activation conditions are met; setting the duty cycle limit value to a sum of the generated duty cycle limit subvalues; setting a second duty cycle value for the PWM, said second duty cycle value being equal to the first duty cycle value when the first duty cycle value is below or equal to the duty cycle limit value and being equal to the duty cycle limit value when the first duty cycle value is above or equal to the duty cycle limit value; and applying the PWM at the second duty cycle value to the valve.

In accordance with still another aspect, the method can include generating a first duty cycle value for the PWM; monitoring a current value of a parameter; generating a duty cycle limit value for the PWM, including activating more than one duty cycle limit functions based on corresponding activation conditions, the corresponding activation conditions based on the current value of the parameter, each of the more than one duty cycle limit functions generating a corresponding duty cycle limit subvalue when the corresponding activation conditions are met, and setting the duty cycle limit value to a sum of the generated duty cycle limit subvalues; setting a second duty cycle value for the PWM, as the first duty cycle value or as the duty cycle limit if the first duty cycle value exceeds the duty cycle limit; and, applying the PWM at the second duty cycle value to the valve.

DESCRIPTION OF THE DRAWINGS

Reference is now made to the accompanying figures in which:

FIGS. 6A-6E are graphs showing example parameters of the system of FIG. 2 as applied to control the rotor speed of a gas turbine engine;

FIG. 7 is a flowchart of an example method for operating an on-off valve;

FIG. 8 is a flow chart of an other example method for operating a valve;

FIG. 12 is a block diagram of an example computing device for implementing the system of FIG. 7 or 8.

DETAILED DESCRIPTION

There is described herein methods and systems for operating a valve coupled to a system without knowledge of the pressure at the inlet of the valve. The valve can be used to control a system parameter affected by the valve position through feedback control. In some embodiments, the system is an engine. The engine parameter may be engine rotor speed, engine pressure, engine temperature, and any other engine parameter affected by the position of the valve, depending on the embodiment. The methods and systems described herein may also be applicable to other systems, such as aircraft, aircraft environmental controllers, anti-ice systems, oil systems, fuel systems and hydraulic control of bleed valves, variable stator vanes and active clearance control, as well as other pneumatic and hydraulic systems not limited to the aerospace industry.

Figure 1:
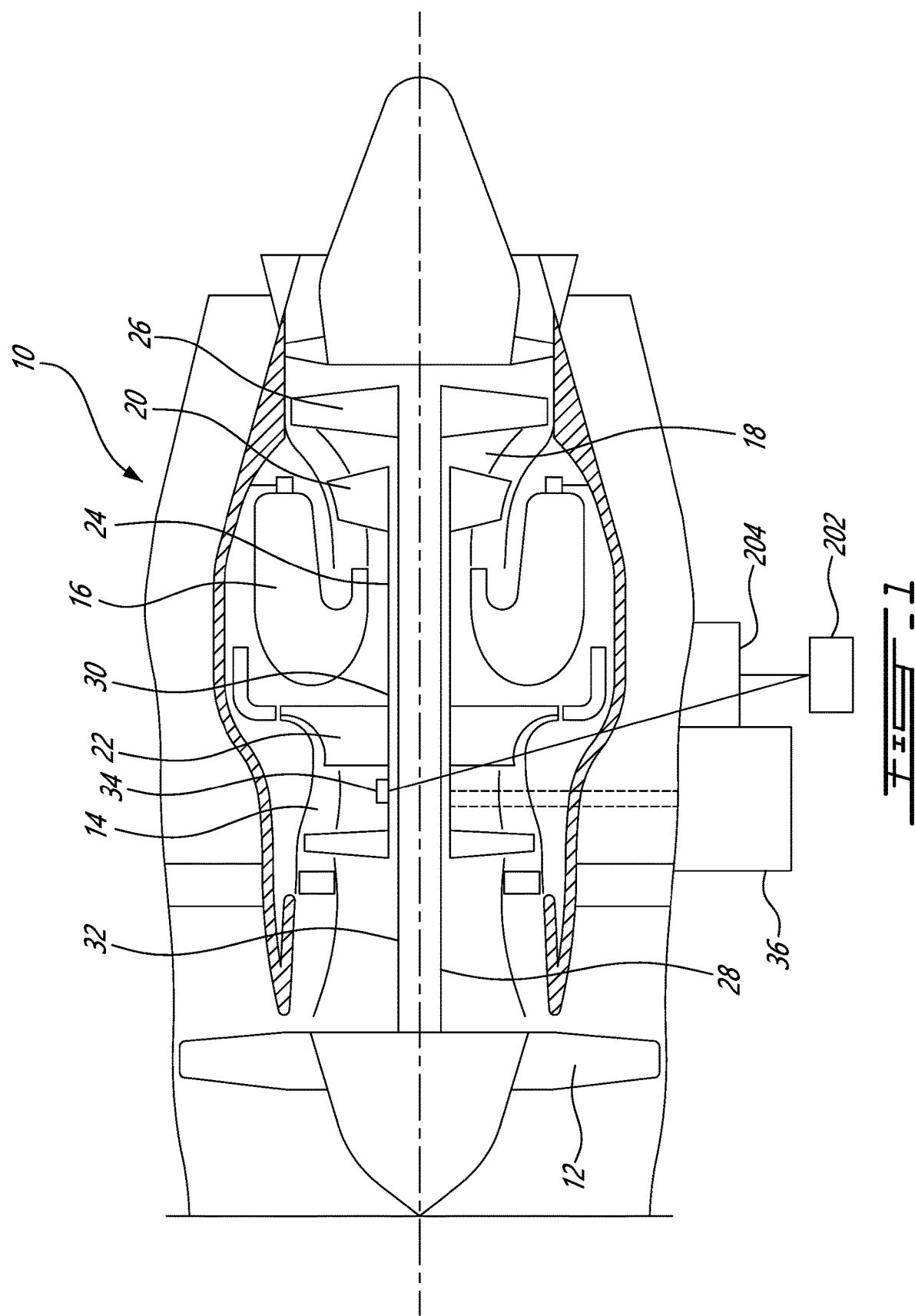
FIG. 1 is a schematic cross-sectional view of a gas turbine engine.

FIG. 1 illustrates a gas turbine engine 10 generally comprising in serial flow communication, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure blades 20 of the turbine section 18 are drivingly engaged to high pressure blades 22 of the compressor section 14 through a high pressure shaft 24, and the combination of these elements which rotate together with one another can be referred to as a high pressure rotor 30. Low pressure blades 26 of the turbine section 18 are drivingly engaged to the fan 12 and to other low pressure blades of the compressor section 14 through a low pressure shaft 28, and the combination of these elements which rotate together with one another can be referred to as a low pressure rotor 32. The low pressure shaft 28 can extend within the high pressure shaft 24 and rotate independently therefrom.

A gas turbine engine can be equipped with a plethora of sensors adapted to allow the monitoring of current values of various engine parameters. In the embodiment illustrated, a rotation speed sensor 34 can be used to sense the angular rotation speed of the high pressure rotor 30, for instance.

A gas turbine engine can be equipped with a number of accessories. In this example, the gas turbine engine is equipped with an air starter 36. The air starter 36 can include a fluid conduit extending between an inlet and an outlet (not shown). The air starter 36 can have a turbine in the air conduit, the turbine configured for extracting energy from pressurized air circulating in the air conduit by rotation. The turbine can be mechanically connected to the high pressure rotor 30 via an accessory gearbox, shafts, and gearing for instance, in a manner to drive the rotation of a high pressure rotor 30 during an engine startup procedure. The inlet can be configured to be connected to an external pressurized air source such as a pressurized air source owned by the airport operator for instance. Since there can be variations in the actual pressure of the pressurized air source, such as from one airport to another, and the actual air pressure may be a priori unknown, it can be desirable for the air starter to offer the flexibility of operating in various conditions. In some embodiments, this can be achieved using a valve 204 positioned in the air conduit and configured to control the flow rate of air through the air conduit. The valve 204 can be a solenoid valve, i.e. a valve having a solenoid actuator, with an actuator controlled by a controller 202 via pulse width modulation (PWM), for instance.

Although illustrated as a turbofan engine, the gas turbine engine 10 may alternatively be another type of engine, for example a turboshaft engine, also generally comprising in serial flow communication a compressor section, a combustor, and a turbine section, and a fan through which ambient air is propelled. A turboprop engine may also apply. The engine may also be another type of engine, such as an electric engine, hybrid engine, a piston engine, and the like.

Figure 2:
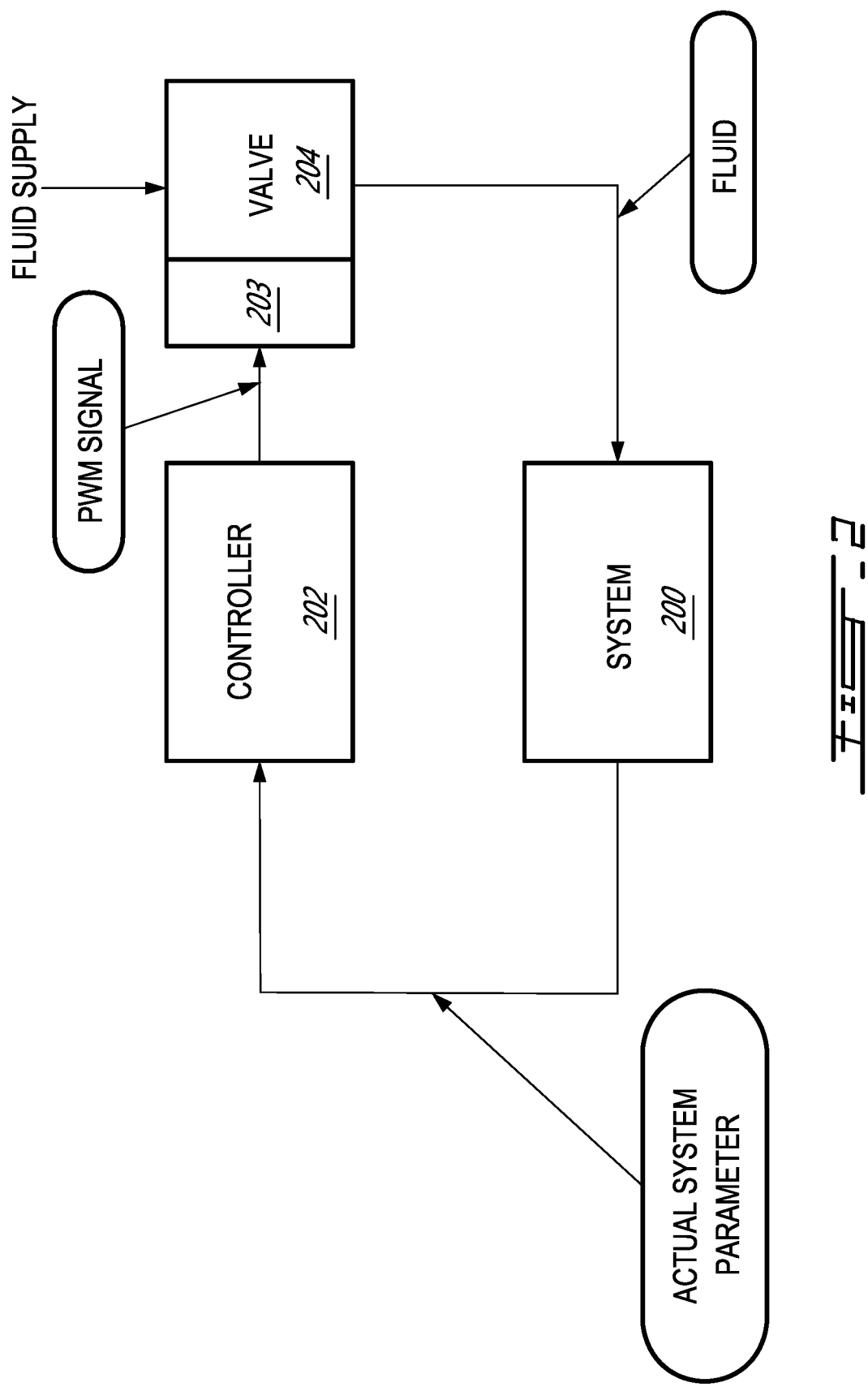
FIG. 2 is a block diagram of an example system incorporating the on-off valve.

Referring now to FIG. 2, a system 200 is coupled to a valve 204, the valve 204 having an actuator 203, the actuator 203 operated by a controller 202. The system 200, which may be the gas turbine engine 10, is downstream from the valve 204 and the degree of opening of the valve 204, as may be defined by the relative position between a poppet of the valve and a valve housing or valve seat, affects the flowrate of fluid across the valve which, in turn, has an impact on at least one parameter of the system 200 (referred to herein as the system parameter). The system parameter can be rotation speed of the high pressure rotor in one example. The position (e.g. degree of opening) of the valve 204 determines how much fluid is allowed to flow to the system 200 (e.g. through an air starter turbine of the engine), thus causing at least one system parameter (e.g. high pressure rotor rotation speed) to vary. In some embodiments, the valve 204 is a solenoid air valve that uses pneumatic regulation to provide enough force to keep the valve closed when not energized and to open a fluid pathway when energized, in order to regulate downstream pressure and a pressure rate. The actuator can be a solenoid actuator, for instance, which is electrically driven by pulse width modulation 204. The valve 204 may be regulated to an intermediate position by rapidly alternating between its energized and non-energized states, using pulse width modulation (PWM). The controller 202 generates a PWM signal and applies the signal to the valve 204 to control its position. The intermediate valve position can be altered by increasing or decreasing the duty cycle of the PWM signal. In alternate embodiments, different types of actuators can be used, such as a pneumatic actuator or a hydraulic actuator for instance.

The actual system parameter, which may be measured or calculated based on other system parameters, is compared to a target system parameter. An error corresponding to a difference between the actual system parameter and the target system parameter is provided to the controller 202. The controller 202 adjusts the duty cycle of the PWM signal based on the error.

When regulating certain system parameters affected by the valve position through feedback control, the initial error between the target system parameter and the actual system parameter sometimes results in the duty cycle of the valve being fully saturated, e.g. at 100% of its control amplitude, which directs the valve to the fully open state. In such circumstances, certain undesirable effects may be observed, caused by an over correction of the valve position. For instance, the allowed flow rate at that point can increase quickly to reach a point where it is greater than the target, before the controller 202 has the time to react and bring the duty cycle back down. These undesirable effects may be a source of potential damage to the engine, and may lead "hunting", a phenomenon associated to oscillation of the duty cycle above and below the value which would correspond to the target, for a certain period of time, before stability is re-established and the regulation of the system parameter is achieved. Hunting near the fully closed position can lead to cycling between fully closed and partially or fully open positions, which can be detrimental to the wear of the valve. In some embodiments, this it can be undesired to cycle near the fully open position as well.

In order to mitigate undesired behaviors, while controlling valve without knowledge of the current value of the inlet pressure, the controller 202 is configured to set an upper limit on the duty cycle of the PWM signal. The upper limit may be set to an initially low value and gradually increased over time. Having a maximum duty cycle on the PWM signal prevents the valve from opening too far and helps reduce the phase difference between the valve and the system parameter being controlled, such that a smooth transient response of the valve and the system parameter can be achieved.

Figure 3:
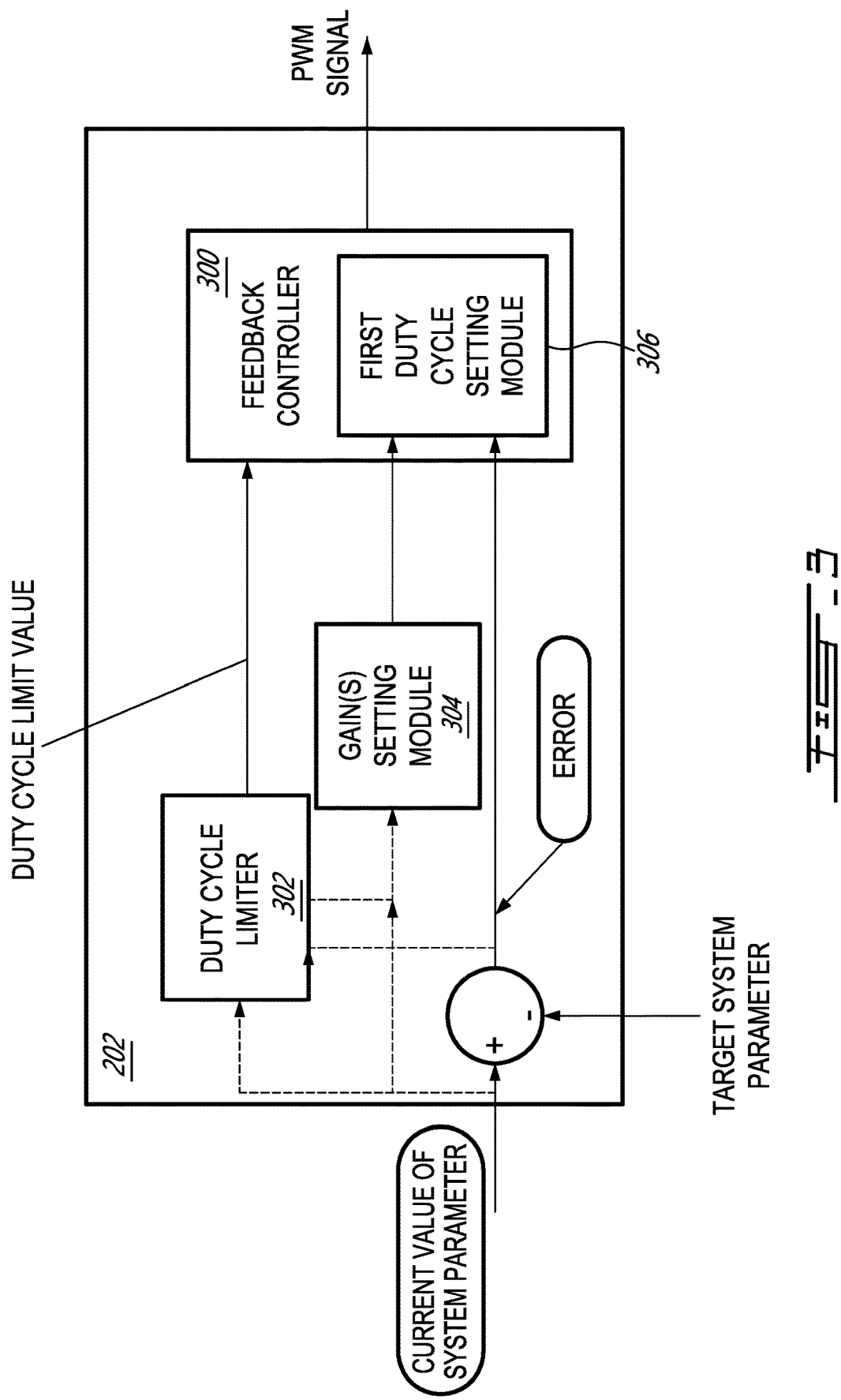
FIG. 3 is a block diagram of an example embodiment of the control system of FIG. 2.

FIG. 3 illustrates an example embodiment of the controller 202, for generating the PWM signal. More specifically, a first duty cycle setting module 306 of a feedback controller 300 can perform the function or functions associated to generating a first duty cycle value for the pulse width modulation. The error is received at the first duty cycle setting module 306, which may be implemented in various manners, for example through a single control mode of proportional, integral, or derivative. The first duty cycle setting module 306 may also be implemented using a combination of control modes. For instance, the feedback controller, such as proportional-integral (PI), proportional-derivative (PD), and proportional-integral-derivative (PID). Other combinations are also possible, and it will be understood that other types of feedback controllers 300 may be used, such as a linear quadratic regulator.

A duty cycle limiter 302 can also receive the error signal, determined from the difference between the actual system parameter and the target system parameter. Alternatively, the duty cycle limiter 302 may receive the actual system parameter and the target system parameter directly. The duty cycle limiter 302 can perform the functionality of setting the upper limit on the duty cycle of the PWM signal to avoid or impede overshooting, for instance, and the upper limit on the duty cycle can vary over time. In this context, the value of the upper limit can be referred to as the duty cycle limit value.

Figure 4:
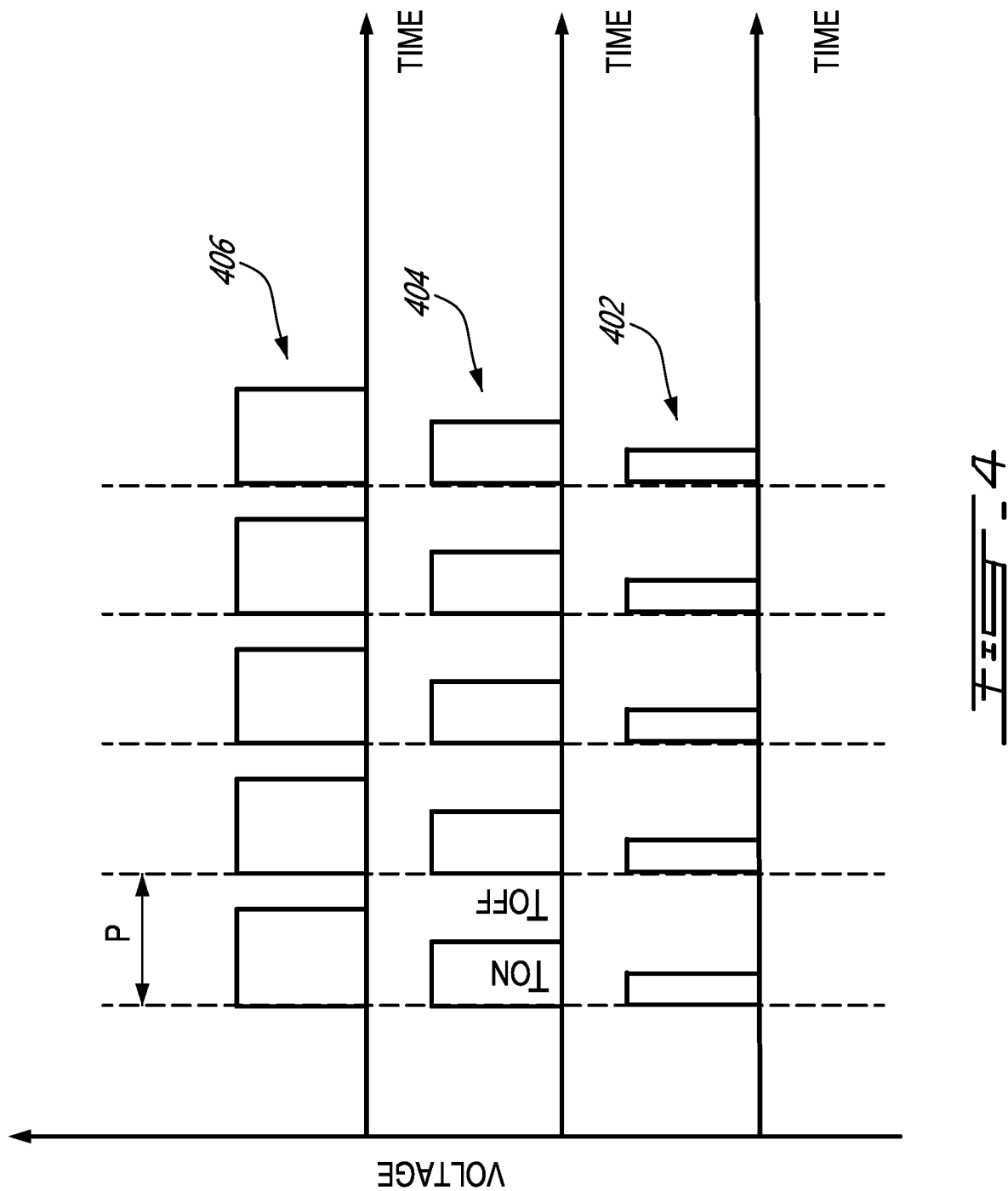
FIG. 4 is a graph showing examples of PWM signals with different duty cycles.

Referring to FIG. 4, there are illustrated example PWM signals 402, 404, 406, having different duty cycles. The duty cycle is related to the amount of power over a unit of time corresponding to the cycle, such as the percentage of time when the signal is high ($T_{ON}$) over the period (P) of the signal. The period (P) is the sum of high time ($T_{ON}$) and low time ($T_{OFF}$) of a cycle of the signal. In the example of FIG. 4, PWM signal 402 has a duty cycle of 25%, PWM signal 404 has a duty cycle of 50%, and PWM signal 406 has a duty cycle of 75%. These values are for illustrative purposes only.

Referring back to FIG. 3, the feedback controller 300 receives the upper limit for the duty cycle from the duty cycle limiter 302. The feedback controller 300 generates the PWM signal in accordance with the error as received, with a duty cycle that does not exceed the upper limit. In other words, a second duty cycle value for the PWM signal may be set to a suitable value for causing the valve 204 to operate at a given intermediate position, without exceeding the upper limit of the duty cycle. More specifically, if the error otherwise guides the first duty cycle setting module 306 to set the first duty cycle value above the upper limit, the feedback controller 300 can react to the upper limit by setting the second duty cycle value of the duty cycle at the value of the upper limit, and apply PWM to the valve at the second duty cycle value or otherwise said generate a PWM signal at the second duty cycle value.

In more explicit words, the controller 202 can control the valve based on the second duty cycle value for the PWM. The second duty cycle value can be set to be equal to the first duty cycle value when the first duty cycle value is below or equal to the duty cycle limit value, but rather set to be equal to the duty cycle limit value when the first duty cycle value is above or equal to the duty cycle limit value.

In one embodiment, the feedback controller 300 can apply one or more gain to the error in order to generate the PWM signal. In some embodiments, the controller 202 comprises a gain(s) setting module 304, which is coupled to the duty cycle limiter 302 and uses the upper limit on the duty cycle to set the one or more gain used by the feedback controller 300 to generate the PWM signal. For example, if the feedback controller 300 is a PI controller, the gain(s) setting module will set a proportional gain and an integral gain for the feedback controller 300. Alternatively, the controller gains may be determined internally to the feedback controller 300.

In some embodiments, in parallel to the duty cycle limiter 302 gradually increasing the upper limit of the duty cycle, the gain(s) setting module 304 gradually adjusts the controller gains. Indeed, the compensation applied by the feedback controller 300 may be tailored to the changing dynamics of the system 200, caused by the change in pressure at the valve 204. As the upper limit on the duty cycle increases, the pressure at the inlet of the valve 204 decreases. The gain(s) setting module 304 may use the upper limit on the duty cycle, as received from the duty cycle limiter 302, as an indication of the inlet pressure and adjust the controller gains accordingly. A lookup table, equation, or other mechanism may be used by the gain(s) setting module 304 to output new controller gains as a function of a new upper limit on the duty cycle.

The duty cycle limiter 302 may be designed for various pressure ranges. For example, the duty cycle limiter 302 may be designed for any pressure range, or for the pressure range of the valve 204. The pressure range may be separated into multiple sub-ranges, with each sub-range having a given upper limit associated thereto. An example is illustrated in Table 1.

TABLE 1

| VALVE PRESSURE | UPPER LIMIT ON DUTY CYCLE | DURATION |
|---|---|---|
| 20 psi-30 psi | 25% | 3 ms |
| 31 psi-43 psi | 50% | 3 ms |
| 44 psi-52 psi | 75% | 5 ms |
| 53 psi-65 psi | 100% | — |

In the example of Table 1, the duty cycle limiter 302 is designed for a pressure range of 20 psi to 65 psi and four different upper limits are associated with subsets of the pressure range. The subsets may be of a same or different size. More or less than four subsets may be used, and the values found in Table 1 are for illustrative purposes only. The duty cycle limiter 302 initially sets the upper limit to 25%. The duty cycle limiter 302 determines from the error whether the target system parameter has been reached. If after a first duration of time, for example 3 ms, the target system parameter has not been reached, the upper limit is increased to 50%. The gain(s) setting module 304 receives the updated upper limit of 50% and retrieves the associated pressure range subset of 31 psi-43 psi. The gain(s) setting module 304 applies a new schedule for the controller gains based on the associated pressure range subset. The duty cycle limiter 302 continues to receive the error and monitor the system parameter. If after a second duration of time, which may be the same as the first duration of time or different, the system parameter has not been reached, then the upper limit is increased to 75%. The controller 202 continues to self-adapt to the dynamic changes in the system 200, until the target system parameter has been reached.

Figure 5:
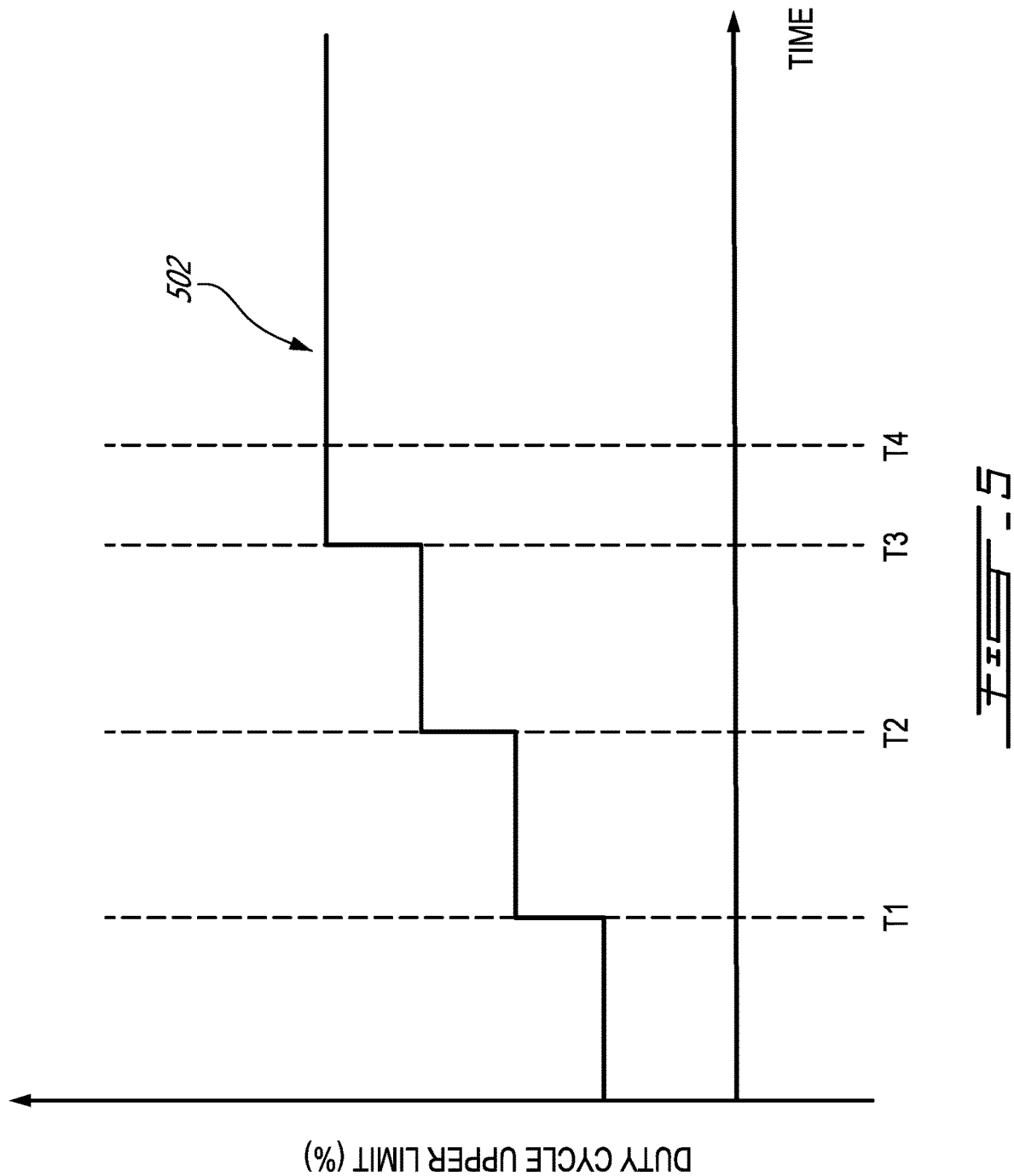
FIG. 5 is a graph showing an example of a duty cycle upper limit over time.

FIG. 5 graphically illustrates the changes to the upper limit on the duty cycle over time. Curve 502 is shown to increase in a stepwise manner at times T1, T2, and T3. At time T4, the system parameter reaches its target and the upper limit on the duty cycle remains constant.

Although illustrated as a step function, other types of functions may be used for the increase on the upper limit of the duty cycle. For example, instead of increasing using discrete steps, the increase may be continuous, either linearly or non-linearly. Suitable values for the upper limit of the duty cycle and the duration of time for which each limit is held may be found empirically or analytically, using tests or simulations. Similarly, suitable controller gains for corresponding inlet pressures may be found empirically or analytically, using tests or simulations. Data obtained through testing and/or simulations may be stored in one or more storage medium, for example in a lookup table, accessible by the duty cycle limiter 302, gain(s) setting module 304, and/or feedback controller 300. Alternatively, functions may solved in real or pseudo-real time by the duty cycle limiter 302, gain(s) setting module 304, and/or feedback controller 300 so as to determine control parameters for the controller 202.

Figure 6A:
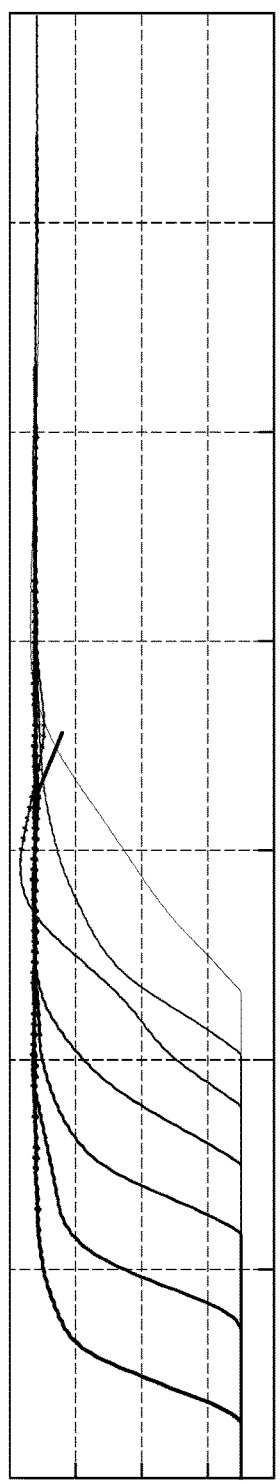
Figure 6B:
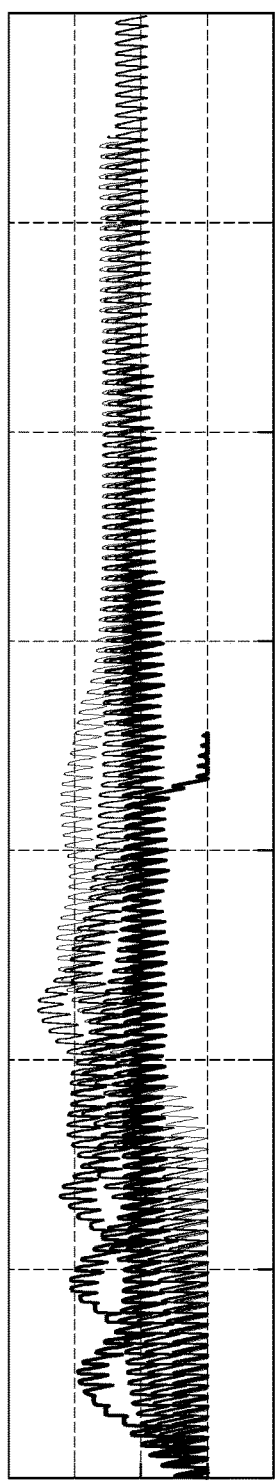
Figure 6C:
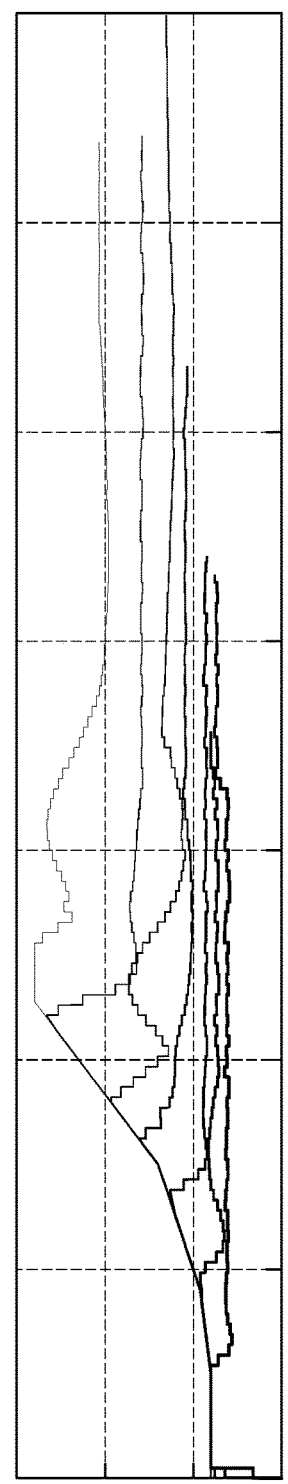

FIGS. 6A-E are graphs showing the control of an engine's inner rotor upon engine startup through the adaptive control of the pulse width modulated duty cycle through a range of expected inlet pressures. FIG. 6A illustrates the speed of the inner rotor over time, for a plurality of starter inlet pressures, i.e. each curve is a controlled engine response with a given starter inlet pressure, where the highest pressure results in the fastest response and the lowest pressure results in the lowest response. FIG. 6B illustrates the position of the valve (a solenoid air valve) over time, for a plurality of starter inlet pressures. FIG. 6C illustrates the actual maximum duty cycle of the PWM signal over time, for a plurality of starter inlet pressures. FIG. 6D illustrates the inlet pressure of the valve over time, for a plurality of starter inlet pressures. FIG. 6E illustrates the output pressure of the valve over time, for a plurality of starter inlet pressures. As can be seen from the graphs, the adaptive control of the duty cycle upper limit can provide a transient and steady state response for the system.

Turning to FIG. 7, there is provided a flowchart of a method 700 for operating an on-off valve coupled to a system for regulating a system parameter. The method 700 may be performed by a controller, such as controller 202, for controlling valve 204 coupled to system 200. As stated above, in some embodiments, the valve is a solenoid air valve and the system is a gas turbine engine. Other systems and types of valves are also applicable.

At step 702, an initial upper limit is set for a duty cycle of a PWM signal to be applied to the valve for controlling a position thereof. The initial upper limit may be predetermined. The initial upper limit may also be determined in real or pseudo-real time, using one or more input parameters. For example, the pressure range of the valve to which the PWM signal will be applied may be used to determine the initial upper limit for the duty cycle.

At step 704, the PWM signal is generated and applied to the valve. The PWM signal may be generated, for example, by a feedback controller, such as the feedback controller 300 of the controller 202. In some embodiments, controller gains are also determined and/or set using the upper limit of the duty cycle, for example by the gain(s) setting module 304 or by the feedback controller 300.

At step 706, the system parameter influenced by the position of the valve is monitored. The system parameter may be any parameter of the system influenced or affected by the position of the valve, such as but not limited to engine rotor speed, engine temperature, engine pressure, fuel flow, oil flow, and the like. In some embodiments, if the system parameter reaches a target parameter, the upper limit on the duty cycle is held at step 708. If the target parameter has not been reached and a duration of time for holding the upper limit has expired, the upper limit on the duty cycle is increased at step 710. In some embodiments, the upper limit is increased at least once after a first duration of time has expired and the target parameter has not been reached. In some embodiments, the upper limit is increased in a stepwise manner, over set time intervals of a same or different duration, to predetermined discrete values. Each increase from one discrete value to another may be of a same or different amount. The increase may also be continuous over time, using a linear or non-linear function. In some embodiments, a defined schedule vs time is used to increase the upper limit on the duty cycle. In some embodiments, the error, or difference between the actual system parameter and target system parameter, is used to determine the increase in the upper limit of the duty cycle over time. A fixed duration of time for holding the limit may be omitted if the increase is based only on the error.

In some embodiments, the method 700 further comprises a step of setting one or more gain or limit (such as a lower limit) of a feedback controller generating the PWM signal as a function of the upper limit on the duty cycle. In some embodiments, the one or more gain may also be adjusted or modified as the upper limit on the duty cycle is increased.

While the embodiment presented above in relation with FIGS. 5-6C can be satisfactory for some applications, it may not be considered sufficiently "quick" in some other applications. Let us recall that the control scheme of a duty cycle limiter 302 may want to satisfy competing needs: i) satisfactory reaction time by opening the valve quickly, ii) avoiding overshooting of the valve opening to avoid potential damage to the engine by excessive pressure, iii) limiting cycling between partially or fully open and the fully closed positions to limit wear. In other words, while increasing the duty cycle limit value over time in a stepwise manner over predetermined periods of time as shown in FIG. 5 may lead to satisfactorily limiting overshooting and/or cycling in some embodiments, it may not allow to satisfy the first need of satisfactory reaction time. For instance, an aircraft pilot may want to see the high pressure rotor speed (which can be referred to as N2) reach an above-idle value quickly, such as within less than 20 seconds, which can put pressure on the time-wise efficiency of the controller 202. Using a step function which satisfies needs ii) and iii) in some embodiments may not allow to achieve that.

In accordance with another example, the duty cycle limit value generated by the duty cycle limiter 302 can be based on a different method. An example of such a different method 750 is presented in FIG. 8. In accordance with such a method, a plurality of duty cycle limit functions 752, 754, 756 can be selectively activated based on corresponding activation conditions (e.g. 758, 760). The corresponding activation conditions being different for different ones of the duty cycle limit functions 752, 754, 756. The corresponding activation conditions can be based on the current value of the parameter which is monitored 764. In one example, the activation conditions can include determining 762 that a current value of the parameter (e.g. rotation speed) is below a corresponding parameter threshold value after a given amount of time has elapsed for instance (i.e. determining 760 that a given elapsed time threshold has been met), with the time thresholds and/or parameter thresholds varying from an activation condition 760, 762 associated to one duty cycle limit function 752 to an activation condition 760', 762', 760", 762" associated to another duty cycle limit function 754, 756.

Each one of the duty cycle limit functions 752, 754, 756 can produce, when the corresponding activation condition is met, a non-zero duty cycle limit subvalue, and the duty cycle limit value produced by the duty cycle limiter 302 can correspond to the sum 766 of any and all duty cycle limit subvalues.

The duty cycle limit functions can produce, when the corresponding activation condition is met, non-zero duty cycle which remains constant over time. The duty cycle limit function can produce, when the corresponding activation condition is met, limit subvalue which increases over time. The rate of increase of the duty cycle limit subvalues over time can be constant/linear, or non-linear, and can be continuous, or stop once a stopping condition is reached, such as a certain maximum for the subvalue is reached, or once a certain amount of time has elapsed. For example, a duty cycle limit function can have the form $$f(x)=a+bx \qquad (1)$$

where x is a time elapsed, b is a constant rate of increase of duty cycle limit subvalue over time (perceived as a slope on a graphically plotted linear relationship), and a is a duty cycle limit subvalue bias.

FIG. 8 presents an example embodiment where three subvalue processes can operate in parallel, potentially independently from one another. In this example, limit subvalue 1 is set per function 1 752 when the current value of the parameter has not yet reached parameter threshold value 1 (target 1) 762 and timer 1 has elapsed 760 (i.e. elapsed time has reached time threshold 1). Function 1 can be of the form of equation (1) above, for instance, with its distinct parameters, e.g. $f_1(x)=a_1+b_1x$ for instance.

Independently, limit subvalue 2 is set per function 2 when the current value of the parameter has not yet reached parameter threshold value 2 (target 2) and timer 2 has elapsed (i.e. elapsed time has reached time threshold 2). Function 2 can be of the form of equation (1) above, for instance, with its distinct parameters, e.g. $f_2(x)=a_2+b_2x$ for instance, where $a_2$ and $b_2$ may be the same, or different from $a_1$ and $b_1$ for instance.

Similarly, one or more additional limit subvalue n, n+1, etc., can be set per a corresponding function n when the current value of the parameter has not yet reached parameter threshold value n (target n) and timer n has elapsed (i.e. elapsed time has reached time threshold n). Function n can be of the form of equation (1) above, for instance, with its distinct parameters, e.g. $f_n(x)=a_n+b_nx$ for instance, where $a_n$ and $b_n$ may be the same, or different from $a_1$ and $b_1$, or from $a_2$ and $b_2$, one or both of which can be zero or non-zero, for instance.

Moreover, in the particular case of a valve of an air starter for instance, it may be known a priori that the valve will have to over come a certain amount of static friction before opening. In such cases in particular, it can be preferred to add an additional subvalue 0 right from the start, which can thence remain constant throught the engine startup process.

Figure 9:
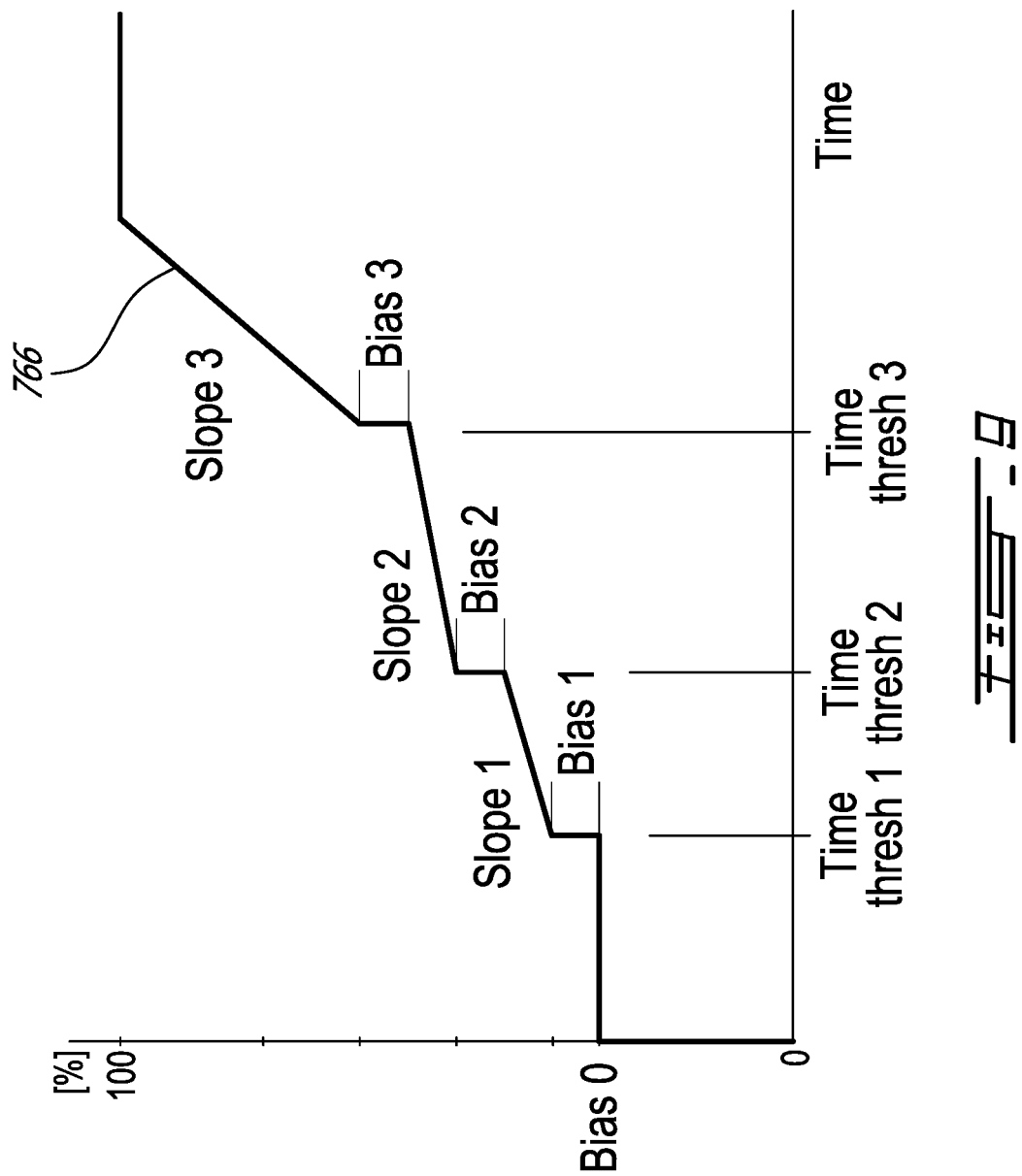
FIG. 9 is a graph showing the evolution of a duty cycle limit value over time based on the method of FIG. 8.

An example of how the process presented in FIG. 8 can play out in an example scenario is presented in FIG. 9, for illustrative purposes. In this scenario, three linear functions are activated based on the satisfaction of associated conditions, $f_1(x)$, $f_2(x)$ and $f_3(x)$, all in the format of eq (1), each having its dedicated, distinct, set of activation conditions, and at least $f_1(x)$ and $f_2(x)$ have a maximum subvalue which is met during the process.

In this illustrative scenario, subvalue 0 corresponds to a constant bias 0 and is applied 768 immediately upon the engine startup procedure and remains constant throughout the engine startup procedure (along the entire axis of time). The activation condition for activation of function 1 is that once time threshold 1 is reached, function 1 is activated if the high pressure rotor speed does not yet exceed a rotor speed threshold 1 (an indication that the pressure is not at the highest considered values), which is the case in this scenario at time threshold 1. Accordingly, beginning at time threshold 1, function 1 generates subvalue 1 in accordance with function 1 ($f_1(x)$), which includes here an initial constant, bias 1 ($a_1$)—represented as an initial step on the graph, and rate of increase 1 ($b_1$), represented as subsequent slope 1 on the graph, leading to a progressive increase of subvalue 1 over time until it reaches the maximum for subvalue 1 which occurs here at time threshold 2. It will be noted that subvalue 1 is continuously added to subvalue 0 over time. Coincidentally in this embodiment, at time threshold 2, the activation conditions for function 2 are met (e.g. rotor speed has not met rotor speed threshold 2 at time threshold 2—an indication that the external pressure is not at intermediary considered values), and function 2 begins then to generate its own subvalue 2 as per its function 2 ($f_2(x)$) which also happens to include here both a non-zero bias 2 ($a_2$), a non-zero rate of increase 2 ($b_2$). In this example, function 2 does not have maximum subvalue and can continue to increase over time until the duty cycle limit value reaches 100% and therefore does not limit the duty cycle anymore. It will be noted here that subvalue 2 produced by function 2 is also continuously added over time to subvalue 1 and subvalue 0, from the moment in time where activation conditions 2 are met until 100% duty cycle limit value is reached. At time threshold 3, activation conditions for function 3 are met (e.g. rotor speed has not yet met threshold 3—an indication that the external pressure is relatively low), at which point a non-zero subvalue 3 begins to be generated by function 3 which also includes an initial bias 3 ($a_3$) and a rate of increase ($b_3$). In this example, the rate of increase $b_3$ is not visible as slope 3 on the graph because slope 3 is in fact the sum 766 of the rate of increase $b_2$ of function 2 which has not yet met a maximum value and the rate of increase $b_3$ of function 3. Here as well, however, subvalue 3 is included in the sum 766 of the subvalues from the time activation conditions 3 are met until the duty cycle limit value reaches 100%.

The result, as seen in the graph, can be a piecewise-linear function when all the functions are linear functions.

Accordingly, in this example scenario, at least two, and more specifically three, duty cycle limit functions increase the corresponding duty cycle limit subvalue over time, and one of the duty cycle limit functions, function 1 specifically, only increases its duty cycle limit subvalue until the corresponding maximum duty cycle limit subvalue is reached. Moreover, between time threshold 3 and the time at which the duty cycle limit value reaches 100%, two duty cycle limit functions which increase the corresponding duty cycle limit subvalue over time, specifically function 2 and function 3, contribute to an overall rate of increase of the duty cycle limit value over time (slope 3).

In such an illustrative scenario, additional functions, such as function 4 or function 5 or function n for instance, may have been provided for, but their activation conditions have not been met, and as such the subvalues which would have been generated by these functions if their activation conditions had been met are at no time during this startup procedure included in the sum leading to the duty cycle limit value shown on the graph.

It will be understood that the scenario presented in FIG. 9 is simply provided for the purpose of facilitating understanding and that various alternatives can exist, such as a different number of functions, functions establishing different relationships (e.g. non-linear relationships), etc, and that even for a specific embodiment of a given number of predefined functions operating in parallel based on corresponding activation conditions such as exemplified in FIG. 8, the exact reaction of the duty cycle limiter 302 over time, i.e. the shape of the graph of duty cycle limit value over time, will vary depending on the current, a priori unknown, conditions, such as amount of friction due to valve wear or amount of pressure in the external pressure source for instance. The initial bias, bias 0, is optional and may be omitted in some embodiments. The number of duty cycle limit functions can vary from one embodiment to another, such as between 2 and 15, 2 and 10, and between 2 and 5 for example.

Figure 10:
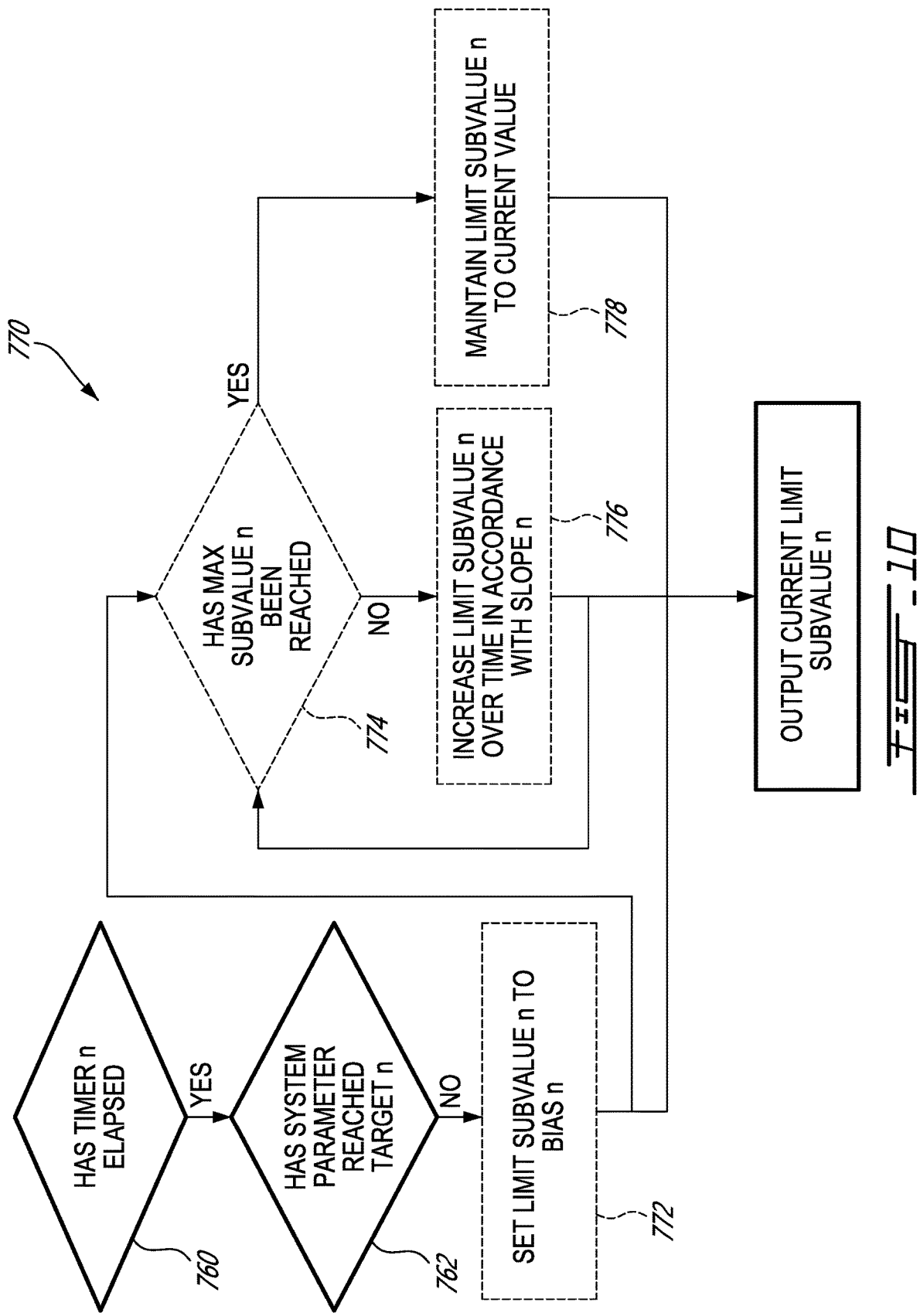
FIG. 10 is a flow chart showing a function increasing the duty cycle limit subvalue over time until a maximum value is met.

A flow chart representing a method 770 of activating a function having a maximum subvalue, such as function 1 in the example above, is presented in FIG. 10. In this example, a constant bias n can be applied 772, or not, upon satisfaction of the activation conditions and maintained throughout an engine startup procedure thereafter. The function can track whether or not its current limit subvalue has reached 774 its maximum value or not, and the limit subvalue can continue to be increased 776 over time in accordance with its dedicated rate of increase (e.g. $b_n$) until the maximum value has been reached, at which point the limit subvalue can be maintained 778 to its current value.

An additional potential functionality which can be used to increase the reaction time, and especially the reaction time associated to the initial opening of the valve (e.g. between 0 and 1% of degree of opening), and which is also represented in the flowchart of FIG. 8 is to artificially accelerate the time elapsed, as perceived by one or more of the timers, when certain conditions are met. This functionality can be referred to herein as a time adder.

Figure 11:
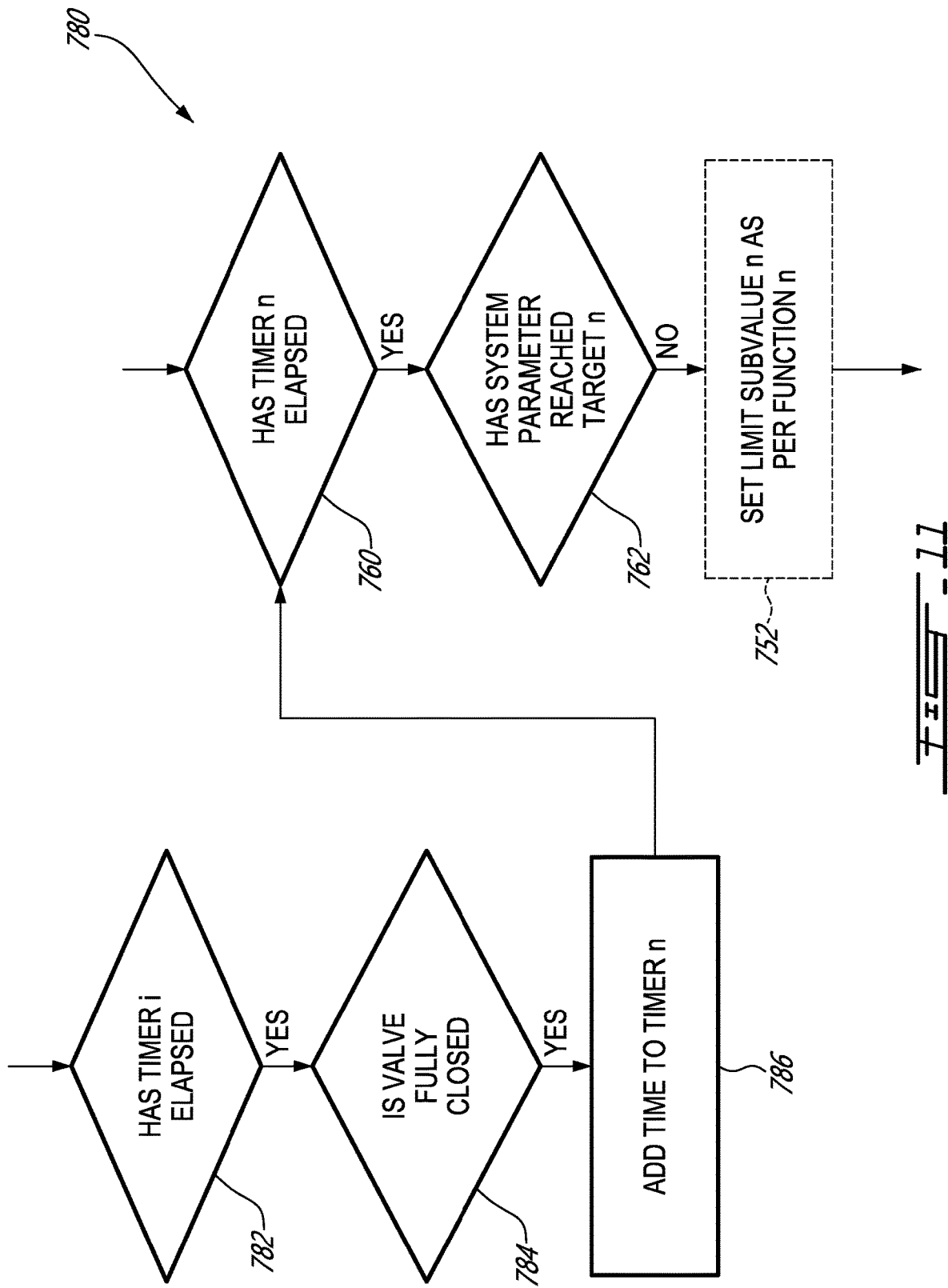
FIG. 11 is a flow chart showing accelerating the time perceived by a timer when certain conditions are met.

Referring to FIG. 11 to present an example method 780 of adding time, if a timer associated to the time adder functionality has reached 782 a given threshold value i, and the valve is still determined 784 to be fully closed, one or more of the timers (e.g. timer n) associated to determining whether the activation conditions of the functions are met or not can be accelerated, such as by increasing 786 their monitored value of time elapsed by a certain amount, or otherwise artificially accelerating their perception of time in a manner to count time faster than "real" time.

Indeed, in some embodiments, the initial resistance of the valve to opening can require increasing the duty cycle to a substantial amount, e.g. more than 10%, more than 15%, more than 25% of the maximum duty cycle, and the exact degree of resistance may not be known by the controller a priori. However, a sensor may allow to monitor whether the valve has opened or not, and such a sensor may be harnessed by the controller to apply the time adder logic to accelerate the initial opening of the valve.

With reference to FIG. 12, an example of a computing device 800 for implemented the method 750 is illustrated. For example, the controller 202 may be implemented with one or more computing devices 800. Note that the controller 202 can be implemented as part of a full-authority digital engine controls (FADEC) or other similar device, including electronic engine control (EEC), engine control unit (ECU), electronic propeller control, propeller control unit, and the like. Other embodiments may also apply.

The computing device 800 comprises a processing unit 802 and a memory 804 which has stored therein computer-executable instructions 806. The processing unit 802 may comprise any suitable devices configured to implement the method 700 such that instructions 806, when executed by the computing device 800 or other programmable apparatus, may cause the functions/acts/steps performed as part of the method 700 as described herein to be executed. The processing unit 802 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 804 may comprise any suitable known or other machine-readable storage medium. The memory 804 may comprise non-transitory computer readable storage medium, for example, but not limited to, an electronic, magnetic, optical, electromagnetic, infrared, or semiconductor system, apparatus, or device, or any suitable combination of the foregoing. The memory 804 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 804 may comprise any storage means (e.g., devices) suitable for retrievably storing machine-readable instructions 806 executable by processing unit 802.

The methods and systems for operating an on-off valve described herein may be implemented in a high level procedural or object oriented programming or scripting language, or a combination thereof, to communicate with or assist in the operation of a computer system, for example the computing device 800. Alternatively, the methods and systems for operating an on-off valve may be implemented in assembly or machine language. The language may be a compiled or interpreted language. Program code for implementing the methods and systems for operating an on-off valve may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating an on-off valve may also be considered to be implemented by way of a non-transitory computer-readable storage medium having a computer program stored thereon. The computer program may comprise computer-readable instructions which cause a computer, or more specifically the processing unit 802 of the computing device 800, to operate in a specific and predefined manner to perform the functions described herein, for example those described in the method 700.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, with regards to the size of the steps used to increase the upper limit of the duty cycle, the number steps, the values associated with each step, the duration each limit is held for, and the like. Yet further modifications could be implemented by a person of ordinary skill in the art in view of the present disclosure, which modifications would be within the scope of the present technology.

The invention claimed is:

1. A method for controlling a degree of opening of a valve using a pulse width modulation (PWM), the degree of opening affecting a parameter of a system, the method comprising:
    at a controller, generating a first duty cycle value for the PWM;
    at the controller, receiving a current value of the parameter;
    at the controller, in response to receiving the current value of the parameter: activating at least two duty cycle limit functions based on a plurality of corresponding activation conditions, the corresponding activation conditions being different for different ones of the at least two duty cycle limit functions and based on the current value of the parameter, each of the at least two duty cycle limit functions generating a corresponding duty cycle limit subvalue when the corresponding activation conditions are met;
    setting a duty cycle limit value to a sum of the generated duty cycle limit subvalues;
    at the controller, setting a second duty cycle value for the PWM, said second duty cycle value being set to the first duty cycle value when the first duty cycle value is below or equal to the duty cycle limit value and being set to the duty cycle limit value when the first duty cycle value is above or equal to the duty cycle limit value; and
    at the controller, controlling the degree of opening of the valve by applying the PWM at the second duty cycle value to an actuator of the valve.

2. The method of claim 1 wherein the system is a gas turbine engine, the valve forms part of an air starter of the gas turbine engine, and the parameter is a rotation speed of a high pressure spool of the gas turbine engine.

3. The method of claim 2 wherein at least one of the corresponding activation conditions includes determining that a current value of the rotation speed is below a corresponding rotation speed threshold and determining that a value of elapsed time exceeds a corresponding elapsed time threshold.

4. The method of claim 3 wherein the at least two duty cycle limit functions are of a form of f(x)=a+bx where the x is a time elapsed, the b is a rate of increase of duty cycle limit subvalue over time and the a is a duty cycle limit subvalue bias.

5. The method of claim 1 wherein said activating the at least two duty cycle limit functions includes activating between 2 and 10 duty cycle limit functions.

6. The method of claim 1 further comprising monitoring a current value of time elapsed.

7. The method of claim 6 wherein at least one of the corresponding activation conditions includes determining that the current value of time elapsed exceeds a corresponding time threshold value.

8. The method of claim 7 wherein said at least one of said corresponding activation conditions includes determining that the current value of the parameter is below a corresponding threshold value for the parameter.

9. The method of claim 1 wherein at least two of the duty cycle limit functions increase the corresponding duty cycle limit subvalue over time.

10. The method of claim 9 wherein at least one of the at least two duty cycle limit functions which increase the corresponding duty cycle limit subvalue over time increases the corresponding duty cycle limit subvalue over time until a corresponding maximum duty cycle limit subvalue is reached.

11. The method of claim 9 wherein the duty cycle limit subvalues of the at least two duty cycle limit functions which increase the corresponding duty cycle limit subvalue over time are included in the sum of the generated duty cycle limit subvalues and contribute to an overall rate of increase of the duty cycle limit value over time.

12. The method of claim 9 wherein the at least two duty cycle limit functions increase the corresponding duty cycle limit subvalue linearly over time.

13. The method of claim 1 further comprising accelerating an indication of time elapsed in association with the corresponding activation conditions when a fixed amount of time has elapsed and the valve remains in a fully closed configuration.

14. A gas turbine engine comprising:
a high pressure rotor;
a rotation speed sensor configured to monitor a rotation speed of the high pressure rotor;
a solenoid valve forming part of an air starter system of the gas turbine engine;
a controller configured to:
generate a first duty cycle value for controlling a degree of opening of the solenoid valve using a pulse width modulation (PWM);
monitor a current value of the rotation speed via the rotation speed sensor;
generate a duty cycle limit value for the PWM, including:
activating at least two duty cycle limit functions based on a plurality of corresponding activation conditions, the corresponding activation conditions being different for different ones of the at least two duty cycle limit functions and based on the current value of the rotation speed, each of the at least two duty cycle limit functions generating a corresponding duty cycle limit subvalue when the corresponding activation conditions are met;
setting the duty cycle limit value to a sum of the generated duty cycle limit subvalues;
set a second duty cycle value for the PWM, said second duty cycle value being set to the first duty cycle value when the first duty cycle value is below or equal to the duty cycle limit value and being set to the duty cycle limit value when the first duty cycle value is above or equal to the duty cycle limit value; and
apply the PWM at the second duty cycle value to an actuator of the valve.

15. The gas turbine engine of claim 14 wherein one or more of the activation conditions include determining that the current value of the rotation speed is below a corresponding rotation speed threshold and that a value of elapsed time exceeds a corresponding elapsed time threshold.

16. The gas turbine engine of claim 15 wherein the at least two duty cycle limit functions are of a form of $f(x)=a+bx$ where the x is a time elapsed, the b is a rate of increase of duty cycle limit subvalue over time and the a is a duty cycle limit subvalue bias.

17. The gas turbine engine of claim 14 wherein the at least two duty cycle limit functions increase the corresponding duty cycle limit subvalue over time.

18. The gas turbine engine of claim 17 wherein at least one of the at least two duty cycle limit functions which increase the corresponding duty cycle limit subvalue over time increases the corresponding duty cycle limit subvalue over time until a corresponding maximum duty cycle limit subvalue is reached.

19. The gas turbine engine of claim 17 wherein the duty cycle limit subvalues of the at least two duty cycle limit functions which increase the corresponding duty cycle limit subvalue over time are included in the sum of the generated duty cycle limit subvalues and contribute to an overall rate of increase of the duty cycle limit value over time.

20. A non-transitory computer readable medium having program code stored thereon and which program code, when executed by a processor of a controller, is operable to cause the controller to control a degree of opening of a valve using a pulse width modulation (PWM), the degree of opening affecting a parameter of a system, said control of the degree of opening of the valve including:
generating a first duty cycle value for controlling the degree of opening of the valve using the PWM;
receiving a current value of the parameter;
in response to receiving the current value of the parameter:
activating at least two duty cycle limit functions based on a plurality of corresponding activation conditions, the corresponding activation conditions being different for different ones of the at least two duty cycle limit functions and based on the current value of the parameter, each of the at least two duty cycle limit functions generating a corresponding duty cycle limit subvalue when the corresponding activation conditions are met;
setting a duty cycle limit value to a sum of the generated duty cycle limit subvalues;
setting a second duty cycle value for the PWM, said second duty cycle value being set to the first duty cycle value when the first duty cycle value is below or equal to the duty cycle limit value and being set to the duty cycle limit value when the first duty cycle value is above or equal to the duty cycle limit value; and
controlling the degree of opening of the valve by applying the PWM at the second duty cycle value to an actuator of the valve.

* * * * *